(12) United States Patent
Forbes et al.

(10) Patent No.: US 6,626,678 B2
(45) Date of Patent: Sep. 30, 2003

(54) METHOD OF PROVIDING MENTAL STIMULUS TO A COGNITIVELY IMPAIRED SUBJECT

(76) Inventors: Elinor Isobel Forbes, 1625 Glenview Rd., #206, Glenview, IL (US) 60025; James Carnegie Forbes, 1625 Glenview Rd., #206, Glenview, IL (US) 60025

( * ) Notice: Subject to any disclaimer, the term of this patent is extended or adjusted under 35 U.S.C. 154(b) by 0 days.

(21) Appl. No.: 09/841,377

(22) Filed: Apr. 24, 2001

(65) Prior Publication Data

US 2002/0006763 A1 Jan. 17, 2002

Related U.S. Application Data

(63) Continuation-in-part of application No. 09/583,378, filed on May 30, 2000.
(60) Provisional application No. 60/232,149, filed on Sep. 9, 2000.

(51) Int. Cl.[7] .............................. G09B 19/00; A63F 9/10
(52) U.S. Cl. ....................... 434/247; 434/259; 434/258; 434/236; 446/1; 273/153 R; 273/156
(58) Field of Search ................................ 434/236–238, 434/112, 128, 197, 171, 172, 175, 193, 204, 259; 446/1, 118; 273/153 R, 156

(56) References Cited

U.S. PATENT DOCUMENTS

| 1,359,646 A | | 11/1920 | Zion | |
|---|---|---|---|---|
| 2,542,948 A | | 2/1951 | Scherf | |
| 2,659,163 A | * | 11/1953 | Albee | 273/157 R |
| 2,707,839 A | * | 5/1955 | Green | 206/749 |

(List continued on next page.)

FOREIGN PATENT DOCUMENTS

GB  1476492 A  *  6/1977  ........... A63F/09/10

OTHER PUBLICATIONS www.ec-online.net/Community/Activitists/allenintervie-w.htm copywrite 2000.*
www.sohp.soton.ac.uk/neuro/SNOEZ.htm copywrite 1999.*
Alzheimer Society of Calgary Conference Page copywrite 2000–01.*
www.lubbockonline.com/news/0222597/stuffed.htm.*
Journal of genontological nursing, The play project–use of stimulus objects with demented patients, Jan. 1990, 16 p32–7.*
BrightSteps ™ by Infantino: Soft Shape Sorter (product insert), © 1998.
Mayers & Griffin (1990). The Play Project. Use of stimulus objects with demented patients. Journal of Gerontological Nursing 16(1), pp. 32–37.
Francis & Baly (1986). Plush animals—do they make a difference? Geriatric Nursing 7(3), pp. 140–142.
Norberg et al. (1986). Reactions to music, touch and object presentation in the final stage of dementia. An exploratory study. Int. J. Nurs. Stud. 23(4), pp. 315–323.

*Primary Examiner*—Derris H. Banks
*Assistant Examiner*—Dmitry Suhol

(57) ABSTRACT

A new method is described of providing mental stimulus to a subject suffering significant cognitive and/or sensory impairment or deterioration, for example a subject having a medically diagnosed dementia such as Alzheimer's disease, and thereby enhancing the subject's psychological condition. The method of the invention comprises causing the subject to handle an article comprising a plurality of pieces that (a) individually have a surface layer formed of a soft fabric, and (b) collectively exhibit differing tactility when handled by the subject.

7 Claims, 5 Drawing Sheets

U.S. PATENT DOCUMENTS

| | | | | |
|---|---|---|---|---|
| 2,786,281 A | * | 3/1957 | Kramer | 206/472 |
| 3,280,499 A | * | 10/1966 | Studen | 446/118 |
| 3,631,975 A | * | 1/1972 | Leibowitz | 206/450 |
| 3,787,259 A | * | 1/1974 | Kleinfeld et al. | 156/78 |
| 3,822,487 A | * | 7/1974 | Koch | 40/620 |
| 4,168,583 A | * | 9/1979 | Halpern | 434/193 |
| 4,458,435 A | * | 7/1984 | Ackerman | 40/405 |
| 4,478,583 A | | 10/1984 | Sellers | |
| 4,494,935 A | | 1/1985 | Miller | |
| 5,080,591 A | | 1/1992 | Forsyth | |
| 5,188,533 A | | 2/1993 | Wood | |
| 5,282,632 A | | 2/1994 | Allen et al. | |
| 5,538,432 A | * | 7/1996 | Dondero et al. | 434/158 |
| 5,626,477 A | | 5/1997 | Adkison | |
| 5,752,701 A | | 5/1998 | Kao | |
| 5,836,304 A | * | 11/1998 | Kellinger et al. | 600/300 |
| 5,865,627 A | | 2/1999 | Foresman | |

\* cited by examiner

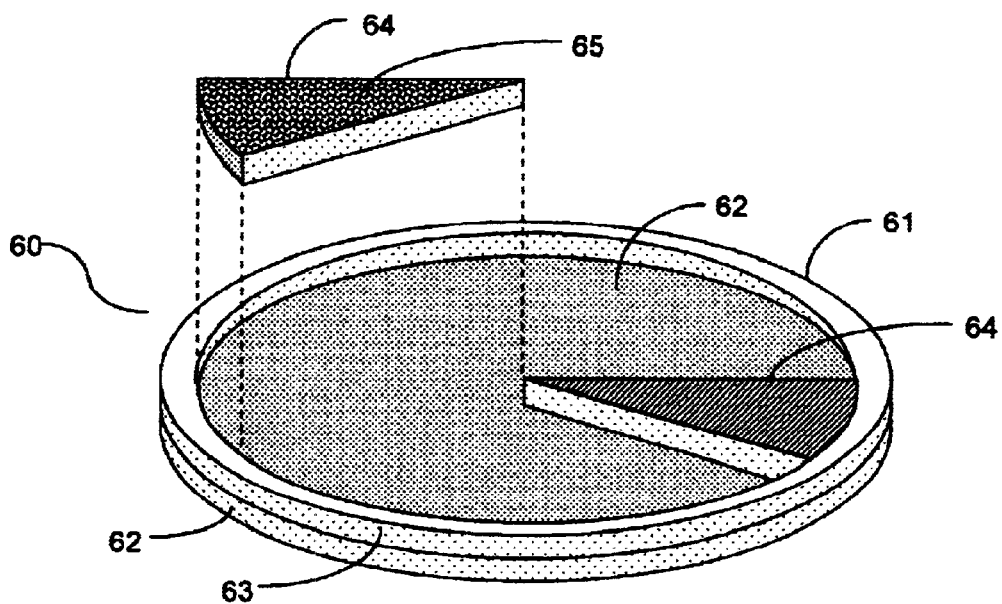
Fig. 6
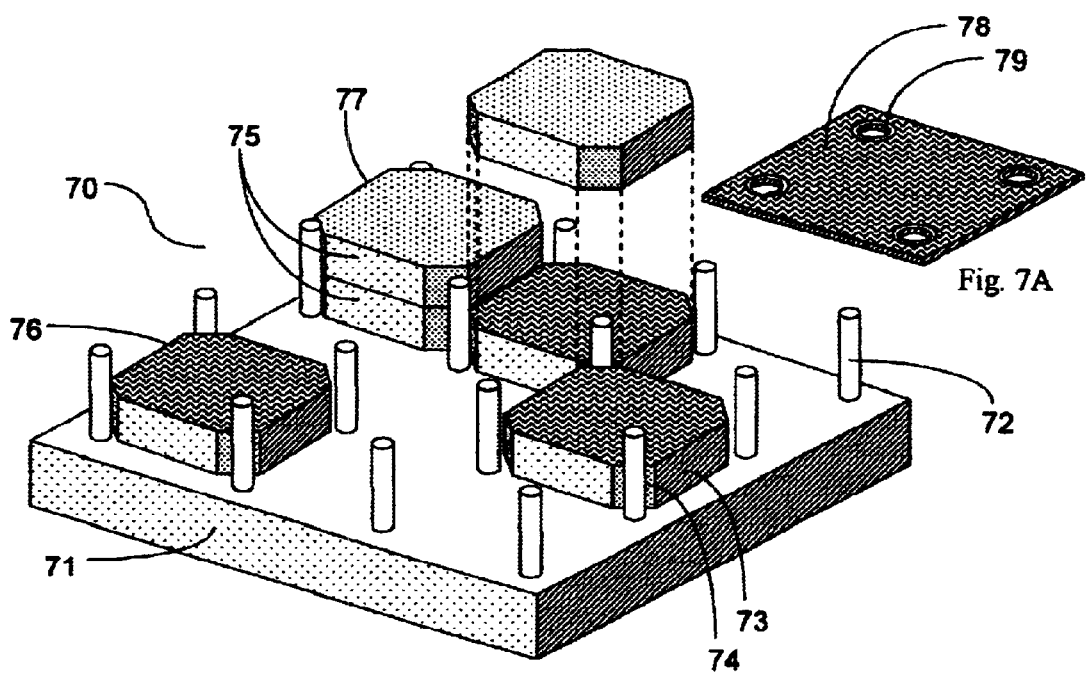
Fig. 7A
Fig. 7

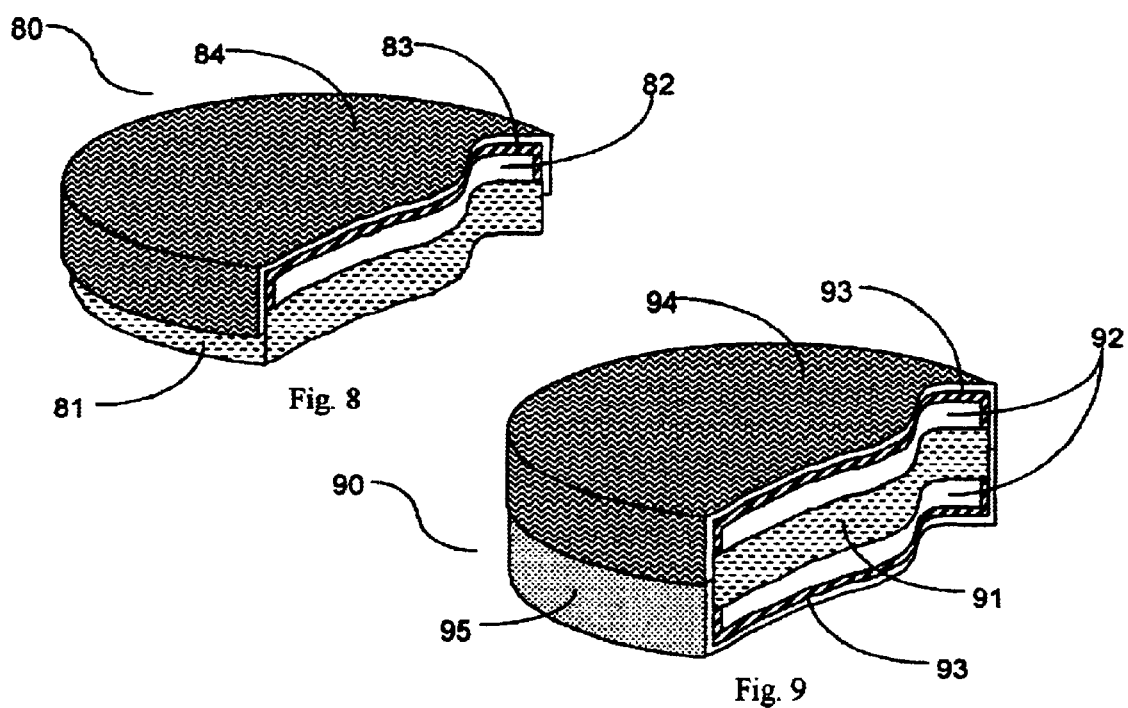

METHOD OF PROVIDING MENTAL STIMULUS TO A COGNITIVELY IMPAIRED SUBJECT

This application is a continuation-in-part of co-pending application Ser. No. 09/583,378 filed on May 30, 2000. This application also claims priority of provisional application Serial No. 60/232,149 filed on Sep. 9, 2000.

FIELD OF THE INVENTION

The present invention relates to a therapeutically and diagnostically useful method and articles for enhancing, through simple pleasurable activity, mental well-being of dementia patients and other people suffering substantial cognitive and/or physical impairment.

BACKGROUND OF THE INVENTION

Progressive improvement in physical health in most populations of the world, most markedly in economically advanced countries, has led to a great increase in average human longevity. Unfortunately as people live longer they become more likely to suffer from various forms of neurodegenerative disease or dementia, including senile and presenile dementias and Alzheimer's disease. Furthermore, people can live with such disorders for long periods of time, often for many years, with only slow progression of the symptoms. Thus improving quality of life of dementia patients is becoming an ever greater need in modem societies.

A problem, particularly in advanced stages of dementia, is that sufferers can become unresponsive to attempts to communicate or interact with them. At the same time, they have in most cases lost the mental acuity to amuse themselves in essentially solitary pursuits that they may have previously enjoyed, such as reading, solving crossword puzzles, assembling jigsaw puzzles or playing games of solitaire. Simple children's toys such as building blocks can sometimes provide entertainment but are usually not well adapted to the particular needs of people whose mental and sensory faculties are in decline rather than in development.

There exists, therefore, a strong need for a way of entertaining and providing an activity focus to dementia patients, that is appropriate both for patients being individually cared for by relatives and for patients in residential or day-care facilities such as nursing homes, geriatric and psychiatric hospitals, etc.

SUMMARY OF THE INVENTION

The present invention derives in part from an observation that in progressive dementias, patients often exhibit more pleasurable responses to stimulation of the sense of touch than to stimulation of other senses, including sight and hearing. In addition, many such patients have significantly impaired senses of sight and/or hearing without major loss of the sense of touch.

The present invention is, in one embodiment, a method of providing mental stimulus to a subject suffering significant cognitive and/or sensory deterioration, the method taking advantage in a new and useful way of the relatively unimpaired sense of touch of such a subject, and thereby enhancing the subject's psychological condition.

The method of the invention comprises causing the subject to handle an article comprising a plurality of pieces that (a) individually have a surface layer formed of a soft fabric, and (b) collectively exhibit differing tactility when handled by the subject.

A "subject suffering significant cognitive and/or sensory deterioration" herein can be a person having a medically diagnosed neurodegenerative disease, for example a dementia, especially a progressive dementia such as senile dementia or Alzheimer's disease; or a person manifesting symptoms of significant impairment of cognitive function, such as memory loss, short attention span, inability to learn new information, inability to interact socially, confusion, loss of verbal communication skills, disintegration of personality, judgment and social graces, etc.; or a person being cared for in a regimen adapted to the needs of a dementia sufferer, for example in a residential facility such as a nursing home, geriatric unit, etc.

The term "article" herein includes both an integral object having the pieces connected together, optionally removably, therein, and a kit comprising separate pieces. The article provided to the subject according to the method of the invention is sometimes referred to herein as an "activity aid".

Soft fabrics herein illustratively include knitted, woven, piliferous and spongiform textiles and real and simulated furs, skins and leathers.

A piece can be constructed of two or more layers, of which a surface layer is formed of a soft fabric; alternatively a piece can consist essentially of the soft fabric surface layer. If desired, a piece can have two opposing surfaces formed of the same or different soft fabrics.

Pieces described herein as exhibiting "differing tactility" are readily distinguishable one from another, and/or have opposing surfaces that are readily distinguishable, by sense of touch alone. The differing tactility can result from the use of soft fabrics that are per se distinguishable by touch, or from other features of the pieces, for example subsurface layers distinguishable by touch through a lightweight surface fabric.

The pieces can be substantially identical in shape and/or construction, or can differ in shape and/or construction from one another, for example constituting two or more sets each comprising one or more substantially identical pieces.

In a presently preferred embodiment, differing tactility is provided at least in part by the soft fabric surface layers. Most preferably, at least one soft fabric used in a surface layer is a piliferous fabric. Without being bound by theory, it is believed that the act of handling a soft piliferous fabric provides particularly pleasurable tactile stimulation for a dementia patient and lends enhanced interest in the activity aid on the part of the patient.

For many subjects, it will be found sufficient to provide the activity aid, and the subject will spontaneously handle the pieces and derive pleasurable tactile stimulation thereby. The term "causing the subject to handle . . . " an article as described herein will be understood to embrace the simple act of providing the activity aid to the subject, even where no further encouragement or assistance is needed to promote handling of the article by the subject. For other subjects, in particular those suffering more advanced stages of neurodegenerative disease, it may be found insufficient merely to provide the activity aid. In such a case, "causing the subject to handle . . . " an article as described herein will typically comprise providing the article to the subject and encouraging and/or assisting the subject to handle the article so as to elicit a tactile stimulus.

In a further embodiment, a kit useful as an activity aid is provided, comprising (a) a plurality of tile elements having one or more faces that are compressively resilient to human touch, wherein each tile element comprises a soft fabric surface layer, a substantially rigid base or core, and a subsurface compressively resilient layer interposed between the surface layer and the base or core; and (b) a rack comprising means for engaging the tile elements at a plurality of loci on the rack, and a rack base whereon the tile elements can rest.

By "compressively resilient" is meant having the properties of (a) being compressible by a light force such as applied, for example, when pressing, stroking, rubbing or squeezing with the fingers, and (b) having a bias to return to an original conformation upon removal of the force. By contrast, the term "rigid", as applied to a base or core of a tile element, means non-compressible and/or non-resilient.

The compressively resilient quality of a tile element according to the present embodiment can reside at least in part in a material of which the subsurface layer is substantially composed, provided the tile element has a surface layer of sufficient flexibility to transmit a light force, such as applied by a finger, to and from the subsurface layer. Examples of such subsurface layers include without limitation paddings (including battings, waddings and stuffings) and cells and cavities filled with air, liquid, gel or solid grains (including beans, rice grains, polystyrene prills and the like). Other suitable compressively resilient materials include without limitation natural and synthetic sponges, solidified foams, cork, rubber and certain soft plastics.

Alternatively or in addition, the compressively resilient quality of a tile element according to the present embodiment can reside at least in part in the soft fabric surface layer of the tile element. Soft fabrics herein illustratively include knitted, woven and piliferous textiles and real and simulated furs, skins and leathers.

The tile elements of any one kit according to the present embodiment can be substantially identical in shape and/or construction, or can differ in shape and/or construction from one another, for example constituting two or more sets each comprising one or more substantially identical tile elements. It is preferred that the soft fabric forming the surface layer of at least one set, and optionally of all sets, of tile elements be a piliferous fabric.

While the kit according to the present embodiment is primarily intended for use by subjects having a medically diagnosed neurodegenerative disease, in particular a dementia, the kit can also have utility as a toy, for example for very young children or for older children having learning or developmental difficulties, as a recreation for blind and partially sighted persons, and for other purposes.

According to the method of the invention, an activity aid as described herein can be used by a single subject, or by two or more subjects together, for example as a simple assembly or construction pastime, a puzzle or a game. From the detailed description below of illustrative embodiments, it will become clear how these and other modes of use are enabled by the present invention.

The method of the invention has therapeutic benefit to a cognitively impaired subject in one or more of the following respects:

(a) it relieves emotional distress or anxiety;
(b) it lends a sense of purpose;
(c) it provides a challenge appropriate to the patient's mental acuity;
(d) it provides a sense of achievement;
(e) it is a simulated "work" activity;
(f) it exercises hand and eye coordination;
(g) it provides tactile feedback where other senses are impaired;
(h) it relaxes, calms or soothes the patient;
(i) it provides a focus of attention;
(j) it encourages interaction between the patient and others;
(k) it can provide solitary entertainment;
(l) it can reduce isolation;
(m) it gives a feeling of greater independence;
(n) it is self-pacing;
(o) it can provide structured or unstructured activity;
(p) it can introduce an element of healthy competition;
(q) it provides a vehicle for communication where sight and/or hearing is lost;
(r) it promotes contentment, happiness and psychological comfort;
(s) it promotes a feeling of connectedness with the subject's environment.

Providing an activity aid to a cognitively impaired subject according to the invention is useful in promoting interaction between the patient and caregivers, visiting relatives and friends, other patients, etc., especially where the patient has substantially lost the faculty of verbal communication.

The method of the invention is also useful diagnostically, for example in assessment of the degree of cognitive impairment in a subject using the activity aid.

In a preferred activity aid, the pieces are soft on all sides and have no sharp edges or corners; in addition they are too large to be swallowed. Such an activity aid therefore poses minimal risk of injury to a patient using the activity aid or to other people in the vicinity.

BRIEF DESCRIPTION OF THE DRAWINGS

FIG. 6 is a perspective view of an activity aid of a sixth embodiment of the invention having tile elements and a rack.

FIG. 7 is a perspective view of an activity aid of a seventh embodiment of the invention having tile elements and a rack.

FIG. 7A is a perspective view of a tile element of alternative construction to those shown in FIG. 7, but suitable for use with the rack shown in FIG. 7.

FIG. 8 is a partially cut-away view of an illustrative tile element that is compressively resilient on one face only.

FIG. 9 is a partially cut-away view of an illustrative tile element that is compressively resilient on two opposing faces.

DETAILED DESCRIPTION OF PREFERRED EMBODIMENTS

Figure 1:
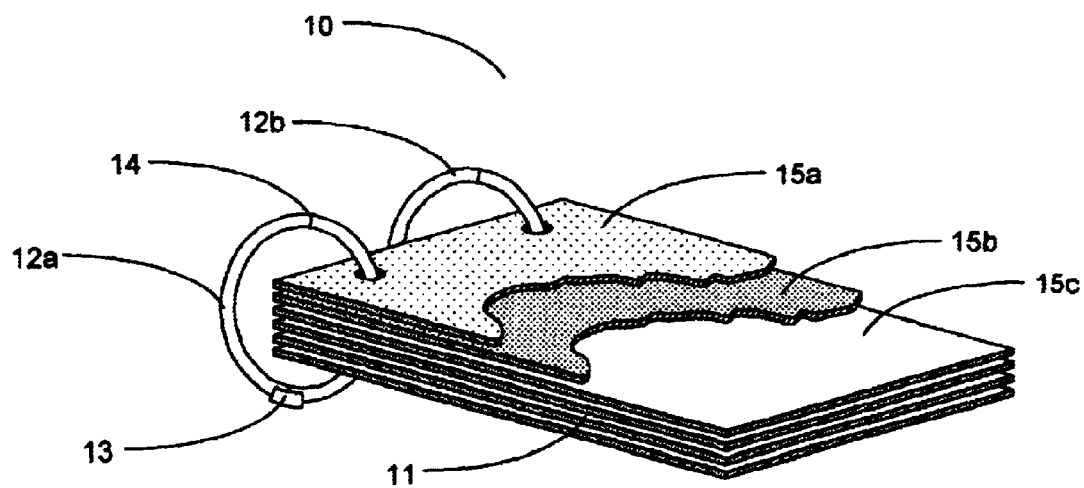
FIG. 1 is a perspective view of an activity aid useful in a first embodiment of the invention, being an article comprising a plurality of pieces in a form of soft fabric swatches, removably bound together.

As indicated above, the method of the invention comprises causing a subject suffering significant mental and/or sensory deterioration to handle an activity aid comprising a plurality of pieces that (a) individually have a surface layer formed of a soft fabric, and (b) collectively exhibit differing tactility when handled by the subject.

Soft fabrics herein illustratively include knitted, woven, piliferous and spongiform textiles and real and simulated furs, skins and leathers. Typically a variety of soft fabrics are used in construction of the activity aid, thereby providing the differing tactility required in practice of the invention. The selection of soft fabrics will be found to have a strong bearing on the degree of pleasure derived by an individual subject through tactile stimulation.

Among types of soft fabric that can be useful according to the invention include fabrics made of natural or synthetic fibers or blends thereof. Illustratively, among suitable fibers from which soft fabrics can be made are natural fibers such as wool (including special types of wool, e.g., alpaca, angora, camel-hair, cashmere, jersey, lambswool, merino, mohair, pashmina, rabbit-hair, vicuna and worsted), silk (including tusser), cotton, silk-cotton, rayon, viscose, linen, flax, sunn, hemp, sisal, jute, tow and raffia; and synthetic fibers such as acrylics, olefin, polyamides (including nylon), polyesters, saran and spandex.

Fabrics can be prepared from these and other fibers by well-known processes including matting (e.g., to make felt), weaving and knitting. Among illustrative examples of suitable woven and knitted fabrics are brocade, burlap, calico, cambric, canvas, chiffon, chintz, crape, crash, crêpe-de-chine, crepon, cretonne, damask, denim, dimity, dowlas, drill, duck, foulard, frieze, gabardine, gauze, georgette, gingham, grosgrain, gunny, hessian, hodden, holland, jaconet, jacquard, kersey, khadi, lace, lawn, linsey, linsey-woolsey, madras, mull, muslin, nainsook, nankeen, ninon, organdy, organza, organzine, percale, poplin, poplinette, ramie, rep, sackcloth, samite, sarsenet, sateen, satin, satinette, seersucker, serge, shalloon, shantung, sharkskin, stockinet, taffeta, tapestry, tulle, tweed, twill, voile and woolsey.

Especially preferred fabrics made from natural and/or synthetic fibers are piliferous fabrics, i.e., those having a pile or nap. Illustrative examples include astrakhan, baize, chenille, corduroy, duffel, flannel, flannelette, fleece, fustian, moleskin, plush, shag, terry, toweling, velour, velveret, velvet and velveteen.

Furs, skins, hides and soft leathers are also suitable soft fabrics for use in construction of the activity aid. Such fabrics illustratively include alligator, buckskin, calfskin, chamois, crocodile, deerskin, doeskin, fleece, goatskin, kid, lizard, morocco, parchment, pigskin, ponyskin, shagreen, sheepskin, snakeskin, suede, vellum and woolfell; also simulations thereof in natural and/or manmade materials such as vinyls (e.g., polyvinyl chloride). However, more preferred among such fabrics are furs and, most preferred, simulations thereof, including beaver, chinchilla, ermine, fox, marten, mink, miniver, musquash, rabbit, sable, seal, squirrel and vair. Simulated or fake furs can be made of any suitable plush fabric.

Spongiform fabrics useful in construction of the activity aid illustratively include materials commonly used to make sponge-cloths and like articles for household cleaning.

If desired, more than one fabric can be used to provide a surface layer. For example, a mosaic of fabrics, e.g., leather and suede, can be joined together, illustratively by gluing or stitching, to form a tactile pattern on a surface of a piece.

Preferably, a soft fabric surface layer is readily washable. An entire piece can be washable; however in a particular embodiment the soft fabric surface layer is removable from and re-attachable to the piece to facilitate washing. For example, the soft fabric surface layer can take the form of a cover having an opening to permit easy removal of the cover, in a similar fashion to a conventional pillow or cushion cover. Such an opening can be secured, for example, by means of a zipper, Velcro™, snaps, fold-over top or the like.

In one embodiment, a piece consists essentially of a swatch of soft fabric; i.e., the "surface layer" as defined above forms the entire piece. Where the fabric is frayable, as for example in the case of many woven fabrics, edges of the swatch are preferably provided with means to inhibit fraying, for example by pinking, binding or hemming. In the case of woven fabrics composed of fibers of a synthetic polymer having relatively low melting point, fraying can be inhibited by application of heat to the edges to partially fuse the fibers.

Alternatively, a piece can be constructed of two or more layers, of which a surface layer is formed of a soft fabric. In one embodiment, a piece comprises two opposing surface layers formed of the same or different soft fabrics. The two soft fabric layers of this embodiment can be attached together by any suitable means, for example by stitching, typically around the edges of the piece. Optionally the piece can incorporate a subsurface layer between the surface layers; preferably the subsurface layer is compressively resilient as defined above. If desired, the opposing surface layers can be stitched together through a subsurface layer, forming for example a quilted piece.

Paddings and solid grain (e.g., bean-bag) fillings are preferred materials for constructing a subsurface layer. Illustrative examples of suitable paddings include any of the natural and synthetic fibers listed above as materials for the surface layer, cotton wool and synthetic fiber imitations thereof, down, feathers, felt, foam rubber and synthetic imitations thereof, horsehair, kapok, mungo and wool shoddy.

The differing tactility of pieces can result from the use as surface layers of soft fabrics that are per se distinguishable by touch, or from subsurface layers or fillings distinguishable by touch through a lightweight surface fabric.

It will be found advantageous in many situations to include a shape-defining insert, made for example of thin card, acetate, plastic laminate or similar material, between two surface layers, between a surface layer and a subsurface layer, or otherwise in the interior of a piece. A shape-defining insert can be included substantially perpendicular to a surface layer, forming a band partially or completely surrounding a subsurface layer. Alternatively or in addition, a shape-defining insert can be included parallel to a surface layer. In such a case, the shape-defining insert is preferably sufficiently thin and/or flexible to transmit light forces to and from an underlying compressively resilient subsurface layer, while having sufficient stiffness to enable the piece to retain its shape.

While it is important that each piece have at least one compressively resilient face, it can be advantageous to provide in each such piece a base or core that is substantially rigid. Such a rigid base or core can be made of any suitable solid, preferably lightweight material, including without limitation wood, thick card, composition board, fiberglass, plastic, aluminum, expanded polystyrene or ceramic. Over such a rigid base or core are laid one or more compressively resilient layers, the surface layer being composed of a soft fabric as described above.

The soft fabric surface layer and optional subsurface layers can be affixed to the rigid base or core by any known technique of upholstery, including by means of pins, staples, tacks, glue, stitching, combinations thereof, etc. The affixing means such as staples are preferably not readily visible without dismantling the piece; this can be accomplished, for example, by folding the soft fabric over the staples in the manner customarily employed by upholsterers.

The pieces provide at least tactile stimulation to the subject. In a preferred embodiment, the pieces additionally provide stimulation of at least one of the senses other than the sense of touch. For example, the pieces can be colorful or boldly patterned to provide visual stimulation.

Alternatively or additionally, a subsurface layer of the pieces can contain beads, hollow spheres or other granular elements having freedom of movement and providing aural stimulation as they collide and rub together. Aural stimulation can also be provided through incorporation in a piece of a device that generates sound in response to handling, for example a squeaker, tinkly bell, clicker, etc.; or through selection of a soft fabric surface layer that itself generates a sound when rubbed or stroked. If desired, sound-generating devices can be included in pieces producing different sounds, for example different musical notes each of a particular pitch, quality of sound or timbre, or different melodies, each note or melody being optionally associated with a particular surface texture to permit association in the user's mind between the tactile and aural stimuli. Such sound-generating devices are well known, being commonly used for example in children's soft toys and musical greeting cards.

Alternatively or additionally, the pieces can be aromatic or perfumed, for example through impregnation of a subsurface padding layer with a suitable essence or through inclusion of a non-airtight or porous sac containing solid perfumed material such as potpourri, thereby providing olfactory stimulation. Thus in one embodiment of the invention, the activity aid provides multisensory stimulation.

Pieces according to the present invention can be of any shape, but are most suitably geometric, e.g., circular, rectilinear, triangular, polygonal, etc., or representative of a familiar object, e.g., a house, an automobile or a tree, or of a familiar animal, e.g., a cat, a goose or a fish.

In one embodiment the pieces have abuttable edges and are suitable for arranging on a flat surface such as a table-top or tray to form a pattern or mosaic. Optionally such pieces can be provided at edges thereof with engaging means to enable such a pattern or mosaic to resist accidental disarrangement. If desired, the pieces can be irregularly shaped but designed to fit together in the manner of a simple jigsaw puzzle to form the pattern or mosaic.

The surface layers of such pieces can optionally be decorated in such a way as to form a design, pattern or picture when correctly assembled. Alternatively, the surface layers of such pieces can be decorated with indicia that suggest or indicate a particular sequence or arrangement in which the tile elements should be assembled. Decoration of the surface layers can be in a visual medium, e.g., color, and/or in a tactile medium, e.g., appliqué.

In pieces having two opposing soft fabric surface layers, the opposing surfaces can be similarly or differently decorated, or one or both surfaces can be undecorated. In one embodiment, the decoration on the two surfaces is such as to provide two alternative designs, patterns or pictures when the pieces are assembled in alternative orientations.

Pieces can optionally have cutouts or be in the form of frames into which photographs, letters, certificates or other memorabilia can be inserted.

In one embodiment, the activity aid used according to the method of the invention is an article comprising a plurality of soft fabric swatches bound together, preferably removably, in a stack. Preferably the swatches are bound along one edge. Many manufacturers of soft fabrics distribute to retailers such an article, herein referred to as a "swatch-book", to display samples of different fabrics to prospective purchasers. Although such swatch-books are common articles, they are not generally available for sale and, prior to the present invention, have not been recognized as being useful as activity aids for subjects suffering cognitive impairment or dementia. Many such swatch-books are not ideal for use according to the present invention, for example because the fabrics represented therein provide insufficient tactile contrast.

It is therefore contemplated that an example of an activity aid useful according to the method of the present invention is an adaptation of a swatch-book, wherein (a) fabric swatches are selected to provide differing tactility;

(b) swatches preferably include fabrics such as piliferous fabrics, e.g., velours and plushes, that provide particularly pleasurable tactile stimuli to the subject;

(c) colors and patterns are preferably selected to be appropriate to tastes of older people;

(d) the size of swatches is consistent with easy manipulability by a cognitively impaired subject;

(e) a sufficient number of swatches of differing tactility are included to maintain the interest of the subject, but the number is not so great as to make the swatch-book excessively heavy and unwieldy; and (f) individual swatches are preferably removable from the swatch-book.

FIG. 1 illustrates a simple activity aid in the form of a swatch-book 10 useful according to the method of the invention. The swatch-book comprises a stack of swatches 11 held together by rings 12a and 12b that pass through holes near an edge of the swatches. Each ring comprises two segments joined at a hinge 13 enabling the segments to be separated at a point 14 where the segments abut, thereby opening the rings to enable removal of individual swatches. The stack comprises a plurality of swatches; for ease and clarity of illustration only six are shown, but typically up to 20 or more swatches can readily be included in the activity aid. In FIG. 1, differing fabric tactility is represented by the differing patterns used to illustrate swatches 15a, 15b and 15c.

In another embodiment, the activity aid used according to the method of the invention is an article comprising a plurality of soft fabric sheets or "pages" irremovably bound together along an edge to form a book. Optionally the book is provided with front and back covers that are not necessarily formed of a soft fabric. The pages are optionally printed, for example with simple text and/or pictures. "Cloth books" as generally described immediately above are well known for use by very young children; however, they are generally constructed of a single type of fabric and consequently do not provide differing tactility.

It is therefore contemplated that an example of an activity aid useful according to the method of the present invention is an adaptation of a children's cloth book, wherein (a) pages are formed of fabrics selected to provide differing tactility;

(b) pages preferably include fabrics such as piliferous fabrics, e.g., velours and plushes, that provide particularly pleasurable tactile stimuli to the subject;

(c) printed matter is preferably selected to be appropriate to tastes of older people;

(d) the size of the pages is consistent with easy manipulability by a cognitively impaired subject; and (e) a sufficient number of pages of differing tactility are included to maintain the interest of the subject, but the number is not so great as to make the book excessively heavy and unwieldy.

Figure 2:
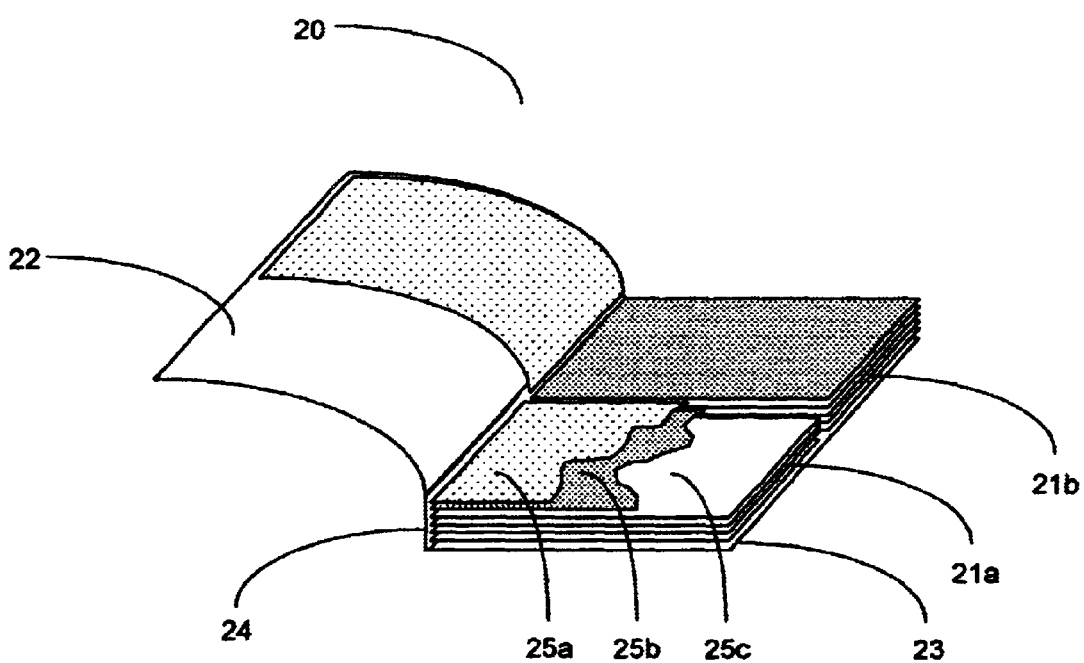
FIG. 2 is a perspective view of an activity aid useful in a second embodiment of the invention, being an article in the form of a cloth book having pages divided in half, each half page representing a piece according to the invention.

In a particular adaptation, the pages of the cloth book are divided into two or more parts that can be turned independently of one another. Such an adaptation is illustrated in FIG. 2, wherein a cloth book 20 comprises two parallel stacks of pages 21a and 21b, a front cover 22 and a back cover 23. The covers in this illustrative example are not divided. The pages and covers are bound by any conventional binding means along a spine 24. For ease and clarity of illustration only six pages are shown in each stack, but typically up to 20 or more pages can readily be included in the activity aid. In FIG. 2, differing fabric tactility is represented by the differing patterns used to illustrate pages 25a, 25b and 25c.

In a further adaptation, one or more of the pages of the cloth book have cutouts or are in the form of frames that can accept photographs or other memorabilia. Such a cloth book can therefore become a "memory book" whereby the tactile stimulation provided by the soft fabric pages is further enhanced by pleasurable evocation of people and events in the subject's life. If desired, such a "memory book" can also contain or be accompanied by a tape player or other audio source capable of playing back recorded voices, music, etc., of personal significance to the subject. Optionally, such a "memory book" can be adapted to provide pleasurable olfactory stimulation, for example by inclusion of a potpourri sachet or other means for releasing fragrant odor.

In another embodiment, the activity aid used according to the method of the invention is a kit comprising a plurality of soft fabric sheets or "patches" suitable for assembly to form a useful and/or decorative patchwork article. Patchwork kits are known articles of commerce; however, prior to the present invention, such kits have not been recognized as being useful as activity aids for subjects suffering cognitive impairment or dementia. Many such patchwork kits are not ideal for use according to the present invention, for example because the fabrics represented therein provide insufficient tactile contrast, and/or because their assembly requires a level of cognitive and/or manual dexterity no longer possessed by a dementia sufferer.

It is therefore contemplated that an example of an activity aid useful according to the method of the present invention is a kit comprising a plurality of soft fabric patches selected to provide differing tactility, each patch being attachable along an edge thereof to one or more other patches by attaching means not requiring a high level of cognitive and/or manual dexterity to form a patchwork article. The patches (a) preferably include fabrics such as piliferous fabrics, e.g., velours and plushes, that provide particularly pleasurable tactile stimuli to the subject;

(b) preferably are colored and/or patterned in a manner appropriate to tastes of older people;

(c) are of sizes consistent with easy manipulability by a cognitively impaired subject; and (d) are included in the kit in a sufficient number to maintain the interest of the subject and enable assembly of a patchwork of appropriate dimensions to form a useful and/or decorative article, for example a mat, a flag, a chairback, a tablecloth, a bedspread, a baby's blanket, a quilt, a wall-hanging, a potholder, a cushion or pillow cover, a throw, a wrap, an afghan, etc.

Figure 3:
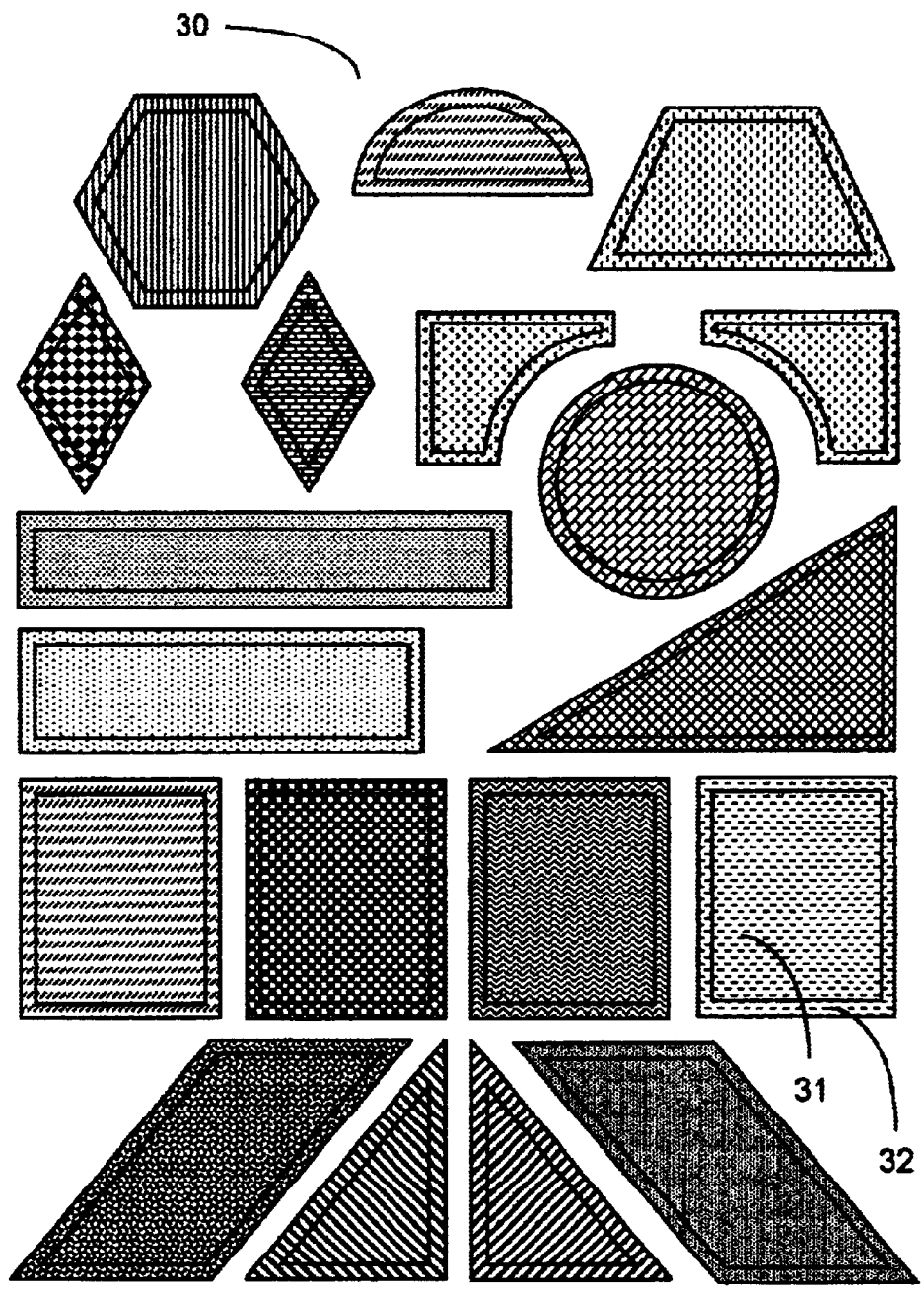
FIG. 3 is a representation in plan view of a portion of an activity aid useful in a third embodiment of the invention, being a kit comprising a multiplicity of pieces having abuttable edges.
Figure 4:
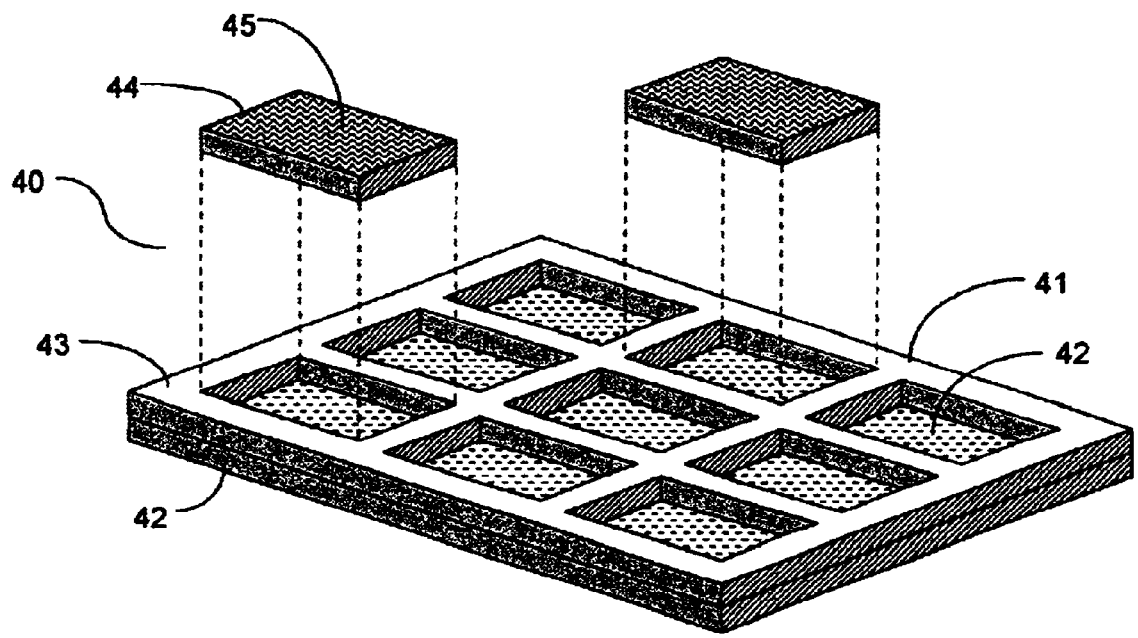
FIG. 4 is a perspective view of an activity aid of a fourth embodiment of the invention having tile elements and a rack.

Such a kit is illustrated in FIG. 3. This illustrative kit comprises a plurality of soft fabric patches 30 of differing fabric tactility as represented in FIG. 3 by differing patterns, and of a variety of shapes. The shapes of the patches are such as to permit edge-to-edge assembly to form a patchwork article. Each patch 31 is bounded by an edge region 32. Edge regions preferably have means to inhibit fraying and are adapted to permit attachment to edge regions of other patches by any suitable attaching means.

Two patches to be attached together are first aligned along edges thereof, either by abutting or by overlapping the edge regions. The edge regions of the aligned patches are then attached together by the attaching means, which can be provided as part of the kit or separately.

One preferred attaching means comprises stitching with suitable thread or yarn; in this case it is particularly preferred to provide as part of the kit a needle, most preferably a large, blunt needle with a large eye, such as a bodkin, and a sufficient quantity of a stitching thread or yarn of sufficient thickness to be readily visible and manipulable by a cognitively impaired subject.

Another preferred attaching means, herein referred to as lacing, comprises a series of holes in the edge region of each patch, and a sufficient number of laces of suitable length for threading through the holes to attach the aligned patches together. Each lace has two ends provided with means to resist undoing of the lacing; for example a T-shaped endpiece can be present at each end of the lace, of sufficient size to resist withdrawal through the holes. The holes can be simple perforations but preferably are bounded by stitching or hemming, for example in the manner of buttonholes, or by annular inserts, for example in the form of eyelets.

Other suitable attaching means for this embodiment include buttons (including toggles that engage loops), studs, snaps, Velcro™, zippers, and other means that will be known to those of skill in the art.

In a related embodiment, the activity aid is a collage kit comprising a plurality of pieces, at least some of which have a soft fabric surface as required herein. Preferably, the pieces can be removably mounted on a substrate, for example by means of an adhesive backing, magnetic strips, Velcro™ or the like. Optionally the collage kit can also include the substrate on which the pieces are to be mounted.

In an activity aid representing a particular embodiment of the invention, the pieces are referred to as "tile elements". According to this embodiment, the activity aid is a kit comprising (a) a plurality of tile elements having one or more faces that are compressively resilient to human touch, wherein each tile element comprises a soft fabric surface layer, a substantially rigid base or core, and a subsurface compressively resilient layer interposed between the surface layer and the base or core; and (b) a rack comprising means for engaging the tile elements at a plurality of loci on the rack, and a rack base whereon the tile elements can rest.

A tile element useful in the present activity aid has at least one compressively resilient face. It is found advantageous to provide a tile element having a substantially rigid base or core as described above. This can result in a tile element having a well-defined shape and exhibiting satisfactory engagement with the rack.

A rigid base can optionally be provided with engaging means complementary to engaging means on the rack. Illustratively, engaging means on the base of a tile element can be a male or female coupling means adapted to engage respectively a female or male coupling means suitably located on the rack. The male coupling means can be, for example, a peg, dowel, foot, protrusion or the like; the corresponding female coupling means can be, for example, a hole, well, socket, indentation or the like. Where such engaging means are provided on the base of a tile element, it is preferably a female coupling that corresponds to and is adapted to engage a male coupling on the rack.

More preferably, however, no engaging means are present on the tile element other than that provided by the shape of the tile element itself, which can be adapted for engagement with the rack as explained and illustrated below.

Over a rigid base or core of a tile element are affixed the subsurface and surface layers providing the required compressively resilient property to at least one face, and optionally to two faces, preferably two opposing faces, or to more than two faces, of the tile element.

In tile elements having two opposing compressively resilient faces, the two faces can have similar or different soft fabric surface layers. Preferably the opposing surface layers are different and readily distinguishable by touch. For example, one face can have a simulated fur surface layer and the opposing face a smooth vinyl surface layer.

The rack can be of any configuration so long as it has means for engaging tile elements at a plurality of loci on the rack. Preferably, the plurality of loci engage the tile elements in an array, for example a two-dimensional array.

Illustratively the rack comprises a rack base having mounted thereon a frame that defines one or more apertures each adapted to receive one or more tile elements, with the proviso that where the frame has only one aperture the aperture is adapted to receive a plurality of tile elements. By "adapted to receive" in the present context is meant being of such a size and shape that an integral number, e.g., 1 to 36, preferably 1 to 24, more preferably 1 to 12, illustratively 1, 6, 9 or 12, of tile elements can be inserted in the aperture so as to rest on the rack base and substantially fill the aperture.

Where an aperture is adapted to receive a plurality of tile elements, the frame of the rack typically has only one aperture. In such a case, the aperture can be of any shape, but is most suitably circular or substantially so; rectilinear or substantially so, for example rectangular or square; or representative of a familiar object, e.g., a house, an automobile or a tree, or of a familiar animal, e.g., a cat, a goose or a fish. Tile elements accompanying a rack with a single circular aperture are suitably, but not necessarily, in the shape of sectors ("pie slices") of radius equal to or slightly less than the radius of the circular aperture and preferably all representing equal radial fractions of a complete circle. Tile elements accompanying a rack with a single rectilinear aperture are suitably, but not necessarily, themselves rectilinear, preferably square, in shape. Tile elements accompanying a rack with a single aperture in the shape of an object or animal are preferably irregularly shaped but designed to fit together in the manner of simple jigsaw pieces to form the shape of the aperture.

Where the frame of the rack has a plurality of apertures, each aperture typically accommodates a single tile element. The apertures can be of identical or similar size and/or shape, or can be of varying sizes and/or shapes, each adapted to receive a tile element of complementary shape. Suitable shapes illustratively include a circle, an ellipse, a square, a rectangle, a triangle, a hexagon, a star, a crescent, a cross, an alphanumeric character, a representation of a familiar object or animal, etc.

The plurality of apertures are suitably but not necessarily arranged in a regular pattern, for example a 3×3 or a 4×4 matrix. Again, the compressively resilient faces of the tile elements can optionally be ornamented or bear indicia.

In use, the rack is typically disposed substantially horizontally, for example on a table or other horizontal surface. For certain users it can be desirable to pitch the rack at an angle, for example an angle of about 10 to about 60 degrees, from the horizontal, to facilitate manipulation. The rack can therefore optionally comprise pitching means such as supports, for example retractable or folding supports, at one side or end of the rack. In an alternative embodiment the rack is disposed substantially vertically, and has means for engaging tile elements that permit their retention in a substantially vertical configuration without a tendency for the tile elements to fall off the rack. For example, the tile elements can be engaged on upwardly directed pegs or hooks on the rack by means of holes or eyelets in the tile elements.

Non-limiting examples of this embodiment are illustrated in FIGS. 4–9.

In an exemplary activity aid 40 (FIG. 4), a rack 41 comprises a rack base 42 having mounted thereon a frame 43 with a plurality of separate apertures, for example cutouts. The frame and apertures are illustratively rectilinear as in FIG. 4 but can be of any shape. Illustratively the apertures are all of similar size and shape and form a regular 3×3 matrix, but can be present in any convenient size, shape, number and arrangement. Each of a plurality of tile elements 44 is adapted to fit and substantially fill an aperture in the frame. Each tile element has at least one compressively resilient textured surface 45 formed of a soft fabric.

Figure 5:
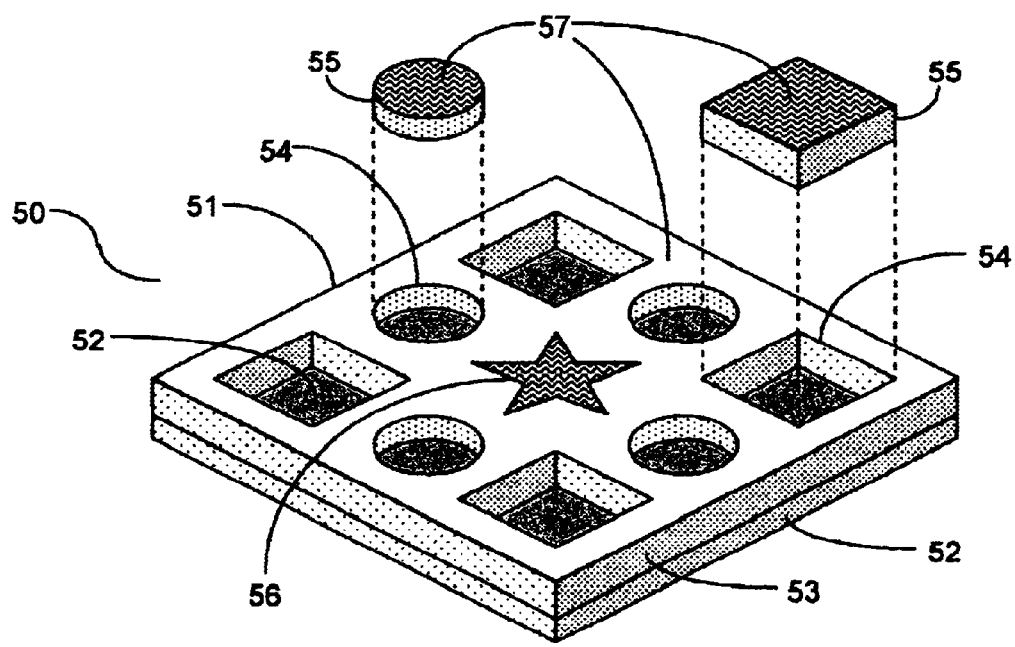
FIG. 5 is a perspective view of an activity aid of a fifth embodiment of the invention having tile elements and a rack, related to the embodiment shown in FIG. 4.

In another exemplary activity aid 50 (FIG. 5), a rack 51 comprises a rack base 52 having mounted thereon a frame 53 with apertures 54, illustratively in the form of cutouts. The cutouts in this example are of a variety of shapes. Illustratively the cutouts form a regular pattern as in FIG. 5 but can be present in any convenient number and arrangement. Each of a plurality of tile elements 55 is adapted to fit and substantially fill a cutout in the frame as illustrated by tile element 56 in FIG. 5. Each tile element has at least one compressively resilient textured surface 57 formed of a soft fabric. Optionally, as illustrated in FIG. 5, the frame has a textured surface similar to that of the tile elements, so that when assembled the activity aid has a large unbroken textured area capable of providing a pleasurable tactile sensation.

Exemplary activity aids 40 and 50 can be used to play a simple game such as tic-tac-toe. For this purpose, preferably two or more sets of tile elements are provided in which the textured surface is distinguishable by touch; optionally the sets of tile elements can also be distinguishable by the other senses, e.g., visually, such as by color or by the presence of indicia on the textured surfaces.

Preferably at least a sufficient number of tile elements is provided to occupy all the spaces in the frame; more preferably the number of tile elements provided substantially exceeds the number of spaces in the frame.

In another exemplary activity aid 60 (FIG. 6), a rack 61 comprises a rack base 62 having mounted thereon a frame 63 enclosing a single undivided aperture. The frame and undivided aperture are illustratively circular as in FIG. 6 but can be of any shape, including rectilinear. Each of a plurality of tile elements 64 is of such a size and shape that on assembly of the activity aid an integral number of tile elements substantially fills the undivided aperture. At least a sufficient number, preferably an exactly sufficient number, of tile elements 64 is provided to substantially fill the aperture in frame 63. Preferably all tile elements 64 are of similar size and shape, illustratively sector-shaped, i.e., resembling pie slices, as in FIG. 6. Each tile element has at least one compressively resilient textured surface 65 formed of a soft fabric.

Activity aid 60 can be designed to form a familiar pattern when assembled. Textured surfaces 65 can optionally bear indicia, distinguishable by sight and/or by touch. In one embodiment all tile elements have a similar surface texture. In a further embodiment each tile element has two opposite textured surfaces formed of different, preferably contrasting, soft fabrics, and a single set of tile elements can thereby be used to form different patterns or designs.

Any integral number of tile elements can substantially fill the aperture; in the illustrated example 12 tile elements of similar size are required to completely assemble the activity aid. The tile elements in this example can suitably bear indicia representing members of a familiar set such as months of the year, years of the Chinese calendar, signs of the zodiac, etc.

In another exemplary activity aid 70 (FIG. 7), a rack comprises a rack base 71 having perpendicularly mounted thereon a plurality of pegs 72. The pegs are arranged to define a plurality of receiving areas for tile elements 73. Illustratively as in FIG. 7 the receiving areas are square and the tile elements square with mitered or rounded corners or cutoffs 74 to engage the pegs.

Tile elements 73 can be of a depth substantially equal to the length of pegs 72, such that a single layer of tile elements fills the rack. Alternatively, as illustrated in FIG. 7, the pegs are sufficiently long to permit more than one layer, for example two layers, of tile elements to be assembled in the rack. Each tile element has at least one compressively resilient textured surface 76 formed of a soft fabric; where the rack is designed to accommodate two or more layers of stacked tile elements 75 it is preferred that the tile elements are presented in two or more sets having contrasting textured surfaces 76 and 77.

An alternative form of tile element suitable for activity aid 70 is illustrated in FIG. 7A and comprises a swatch of compressively resilient soft fabric 78 perforated by a plurality of eyelets 79 in an arrangement adapted to engage pegs 72. Optionally two contrasting swatches can be joined back-to-back, for example by stitching, and the resulting tile element is mountable on the rack with either swatch upward. In such a case a compressively resilient filling or padding can optionally be present between the swatches, and the resulting tile element can optionally be quilted.

Details of construction of tile elements suitable for use in any of the above exemplary activity aids are illustratively shown in FIGS. 8 and 9.

In an exemplary single-sided tile element 80 (FIG. 8), a rigid base 81 underlies an optional subsurface layer 82 of a padding material, optionally covered with a shape-defining insert 83, for example of card or similar material (the thickness of which is exaggerated in FIG. 8 for clarity). Overlying the rigid base and optional padding layer and shape-defining insert is a textured soft fabric surface layer 84 which extends over at least part of the edge or edges of the tile element where the soft fabric is affixed to the base.

In an exemplary double-sided tile element 90 (FIG. 9), a rigid core 91 is under and overlaid on two sides with optional subsurface padding layers 92 and shape-defining inserts 93 (the thickness of which is exaggerated in FIG. 9 for clarity). The padding layers and shape-defining inserts, or in their absence the core itself, are covered on one face of the tile element with a first textured soft fabric 94 and on the opposing face of the tile element with a second textured soft fabric 95, the two soft fabrics preferably having contrasting surface textures. These fabrics are affixed to the core in a similar fashion to the soft fabric of the single-sided tile element of FIG. 8.

The present invention also provides a method of therapy and/or diagnosis of a cognitively impaired subject comprising causing the patient to handle an activity aid as hereinabove described, whereby the patient experiences pleasurable tactile stimulation. Where the pieces are designed to stimulate one or more senses additional to the sense of touch, the patient experiences pleasurable tactile stimulation and, additionally, pleasurable stimulation of at least one sense selected from visual, aural and olfactory senses. In one embodiment the patient experiences multisensory stimulation derived from the activity of attempting to assemble an activity aid of the invention.

It will be clear from the description herein that activity aids of the invention can be adapted to be useful and attractive to subjects exhibiting a broad range of degrees of cognitive impairment. Typically, for a person at an early stage of dementia, an activity aid can be of relatively complex design requiring some degree of mental acuity, concentration and/or manual dexterity, whereas for a person having more advanced dementia, a simpler design will generally be preferable.

Thus, illustratively, an activity aid in the form of a patchwork kit, particularly one as specifically described herein requiring stitchwork or lacing for assembly, could be very useful for providing mental stimulation to a person having relatively mild cognitive and/or sensory impairment. By contrast, for a subject having severe cognitive and/or sensory impairment, such an activity aid would probably be too demanding. A more appropriate choice in this situation could be an activity aid of the "swatch-book" type as described herein. For example, a mature adult in an advanced stage of dementia, for example Alzheimer's disease, can be given a swatch-book as described herein and asked to help select a fabric suitable for making a garment, drapes, re-covering a chair, etc. In many situations this is more conducive to maintaining the subject's dignity than, for example, giving the subject a child's plush toy.

What is claimed is:

1. A therapeutic method comprising causing a subject having a medically diagnosed dementia to use as a cognitive activity aid an article that comprises a plurality of pieces that individually have a surface layer formed of a soft fabric, and collectively exhibit differing tactility when handled by the subject; wherein said article is a kit comprising (a) a plurality of tile elements having one or more faces that are compressively resilient to human touch, each of said tile elements comprising a soft fabric surface layer, a substantially rigid base or core, and a subsurface compressively resilient layer interposed between the surface layer and the base or core; and (b) a rack comprising (i) means for engaging the tile elements at a plurality of loci on the rack, and (ii) a rack base whereon the tile elements can rest; wherein said use provides a therapeutically beneficial cognitive challenge appropriate to the subject's mental acuity.

2. The method of claim 1 comprising causing the subject to use said kit, wherein said soft fabric is selected from the group consisting of knitted, woven, piliferous and spongiform textiles and real and simulated furs, skins and leathers.

3. The method of claim 1 comprising causing the subject to use said kit, wherein each of said tile elements comprises a rigid base and has a single compressively resilient face.

4. The method of claim 1 comprising causing the subject to use said kit, wherein each of said tile elements comprises a rigid core and has two opposing compressively resilient faces.

5. The method of claim 1 comprising causing the subject to use said kit, wherein said rack comprises a frame having a plurality of apertures each adapted to receive one of said tile elements.

6. The method of claim 1 comprising causing the subject to use said kit, wherein said rack comprises a frame having an aperture, and wherein an integral number of said tile elements are of such sizes and shapes as to substantially fill the aperture.

7. The method of claim 1 comprising causing the subject to use said kit, wherein said rack base has perpendicularly mounted thereon a plurality of pegs arranged to define a plurality of receiving areas for said tile elements.

* * * * *